United States Patent
Harding et al.

(10) Patent No.: US 9,126,363 B2
(45) Date of Patent: Sep. 8, 2015

(54) THERMOFORMING PACKAGING MACHINE FOR PRODUCING UPRIGHT STANDING PACKAGES WITH UNDERCUT

(75) Inventors: Kenneth Harding, Olathe, KS (US); J. Scott Nixon, Independence, MO (US); Christian Uebele, Parkville, MO (US)

(73) Assignee: MULTIVAC SEPP HAGGENMUELLER GMBH & CO. KG, Wolfertschwenden (DE)

(*) Notice: Subject to any disclaimer, the term of this patent is extended or adjusted under 35 U.S.C. 154(b) by 679 days.

(21) Appl. No.: 13/234,584

(22) Filed: Sep. 16, 2011

(65) Prior Publication Data

US 2013/0068370 A1 Mar. 21, 2013

(51) Int. Cl.
| | |
|---|---|
| B29C 51/08 | (2006.01) |
| B29C 51/34 | (2006.01) |
| B29C 51/20 | (2006.01) |
| B29C 51/22 | (2006.01) |

(52) U.S. Cl.
CPC .............. B29C 51/34 (2013.01); B29C 51/08 (2013.01); B29C 51/087 (2013.01); B29C 51/20 (2013.01); B29C 51/22 (2013.01)

(58) Field of Classification Search
CPC ...... B29C 51/087; B29C 51/20; B29C 51/22; B29C 51/24; B65B 9/04; B65B 47/00–47/10
USPC ........... 156/69, 469, 196, 199, 242, 245, 470; 249/170–172; 53/452, 453, 559, 561; 425/522, 526, 527, 537, 542, 556, 588; 264/318, 544, 551, 553
See application file for complete search history.

(56) References Cited

U.S. PATENT DOCUMENTS

| | | | | |
|---|---|---|---|---|
| 4,495,135 | A | * | 1/1985 | White .......................... 264/553 |
| 5,307,610 | A | * | 5/1994 | Schneider et al. ............. 53/559 |
| 5,477,660 | A | * | 12/1995 | Smith ............................ 53/433 |
| 6,254,375 | B1 | | 7/2001 | Thomas et al. |
| 2007/0098935 | A1 | * | 5/2007 | Farran et al. ................. 428/35.7 |

FOREIGN PATENT DOCUMENTS

| | | |
|---|---|---|
| EP | 0962386 A1 | 12/1999 |
| GB | 1185150 | 3/1970 |
| GB | 1185150 A * | 3/1970 |
| WO | 2009118597 A2 | 10/2009 |

OTHER PUBLICATIONS

European Patent Office Communication Dated Feb. 13, 2012, Application No. 11007594.2-2308, Applicant Multivac Sepp Haggenmueller GmbH & Co. KG.

* cited by examiner

*Primary Examiner* — Carson Gross
(74) *Attorney, Agent, or Firm* — Husch Blackwell LLP

(57) ABSTRACT

The disclosure is directed to a thermoforming packaging machine (1) for producing upright standing packagings (21) with an undercut (26) formed into the packaging. The machine comprises a forming station (2) with a lower forming tool (30) and/or a sealing station (3) with a lower sealing tool (40). The disclosure is characterized by the lower forming tool (30) and/or the lower sealing tool (40) comprising a movable forming wall section (32) or a movable sealing seam support section (41a), respectively, in the area of the undercut (26). The disclosure is also related to a corresponding method for producing packagings (21).

13 Claims, 8 Drawing Sheets

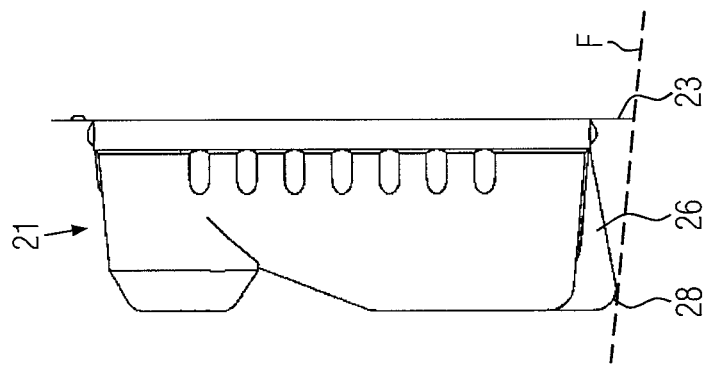
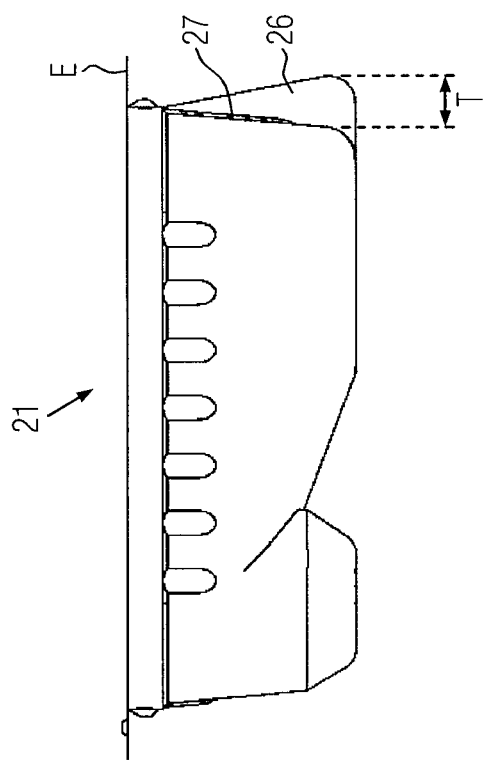
FIG. 3b
FIG. 3a

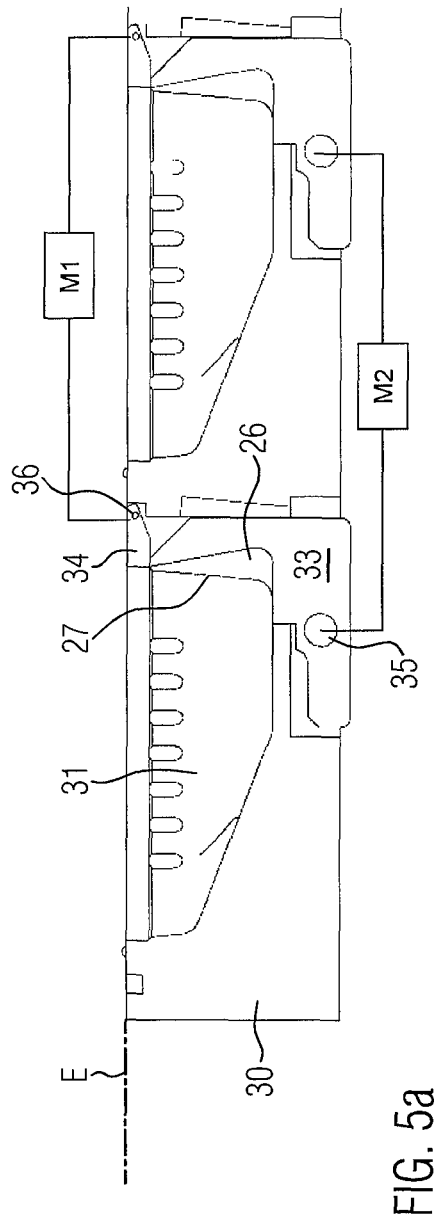
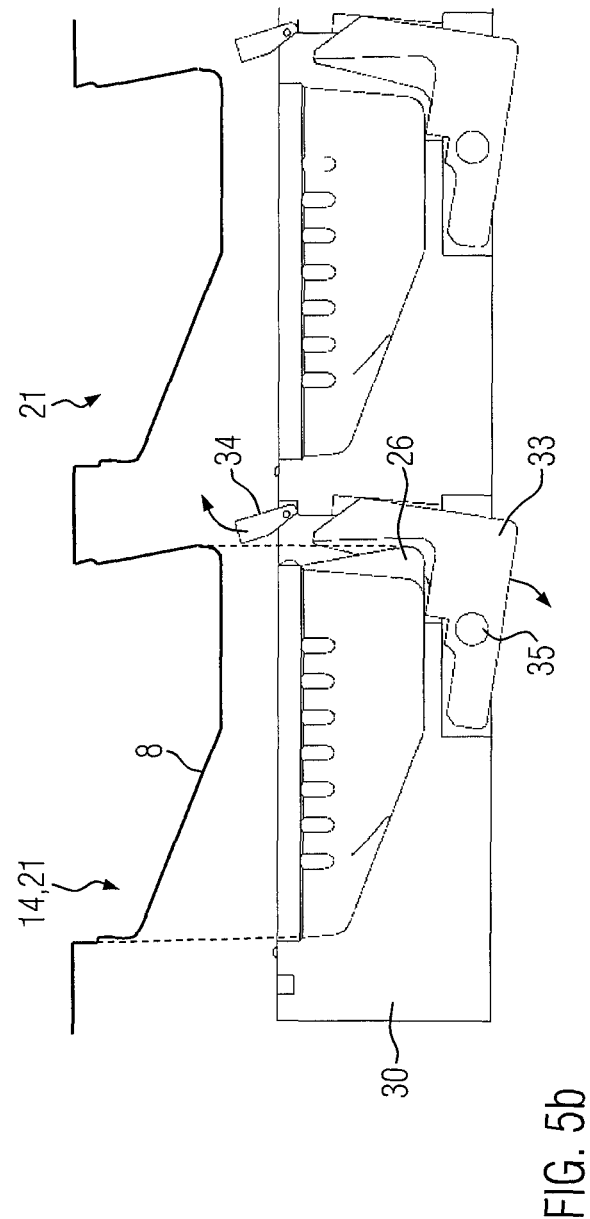
FIG. 5a
FIG. 5b

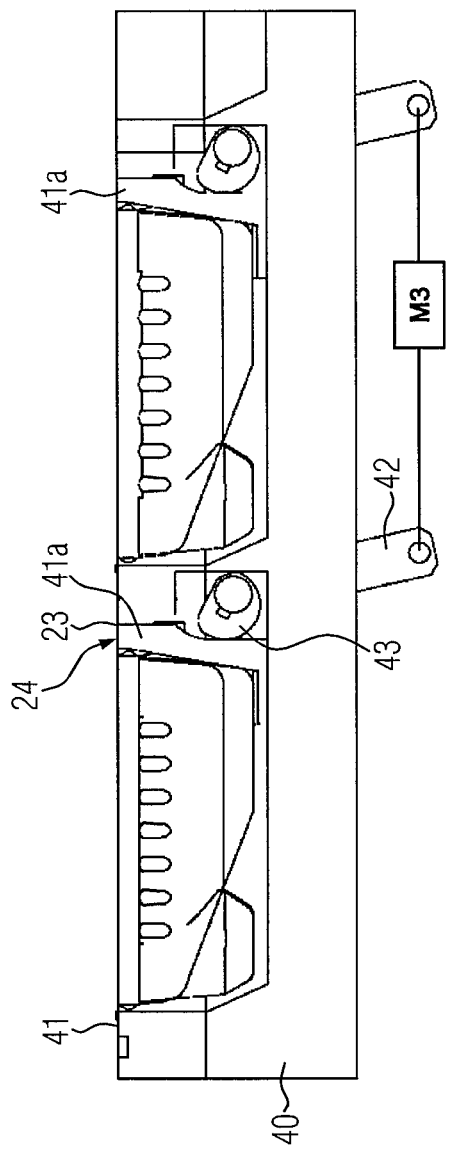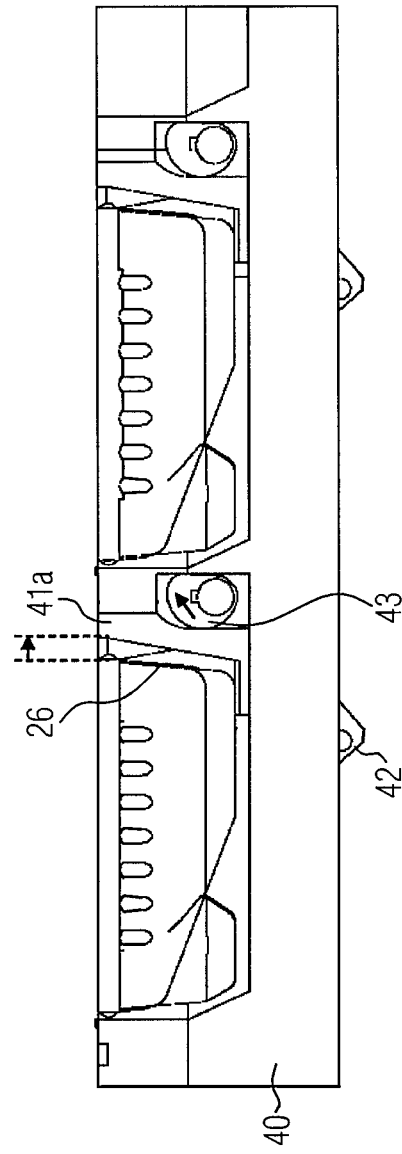
FIG. 7a
FIG. 7b

THERMOFORMING PACKAGING MACHINE FOR PRODUCING UPRIGHT STANDING PACKAGES WITH UNDERCUT

TECHNICAL FIELD

The disclosure relates to a thermoforming packaging machine (or deep drawing packaging machine), as well as to a method of manufacturing packagings or packages.

BACKGROUND

In special editions, thermal forming packaging machines of the Applicant are known which produce packagings with an undercut. The undercut is formed into the lower foil by means of a lifting unit for the forming station which is arranged at an inclination with respect to the transport plane of the lower foil and the transport direction, preferably assisted by a die. The undercut is produced on a side of the deep drawn packaging tray which is parallel to the transport direction. The undercut may reach until below the sealed seam of the packaging, in order to obtain a possibility for upright standing of the packaging. However, with a lifting unit arranged at an inclination and a correspondingly inclined movement of the lower tooling of the mould, it is disadvantageous that the side of the packaging tray which is opposite the side with the undercut is formed parallel to the undercut, but inclined towards the interior of the packaging tray. This is necessary in order to avoid a collision of the molded packaging tray with the lower deep drawing die when opening the forming station. Hence, in a side view, the packaging is shaped in a rhomboid form.

SUMMARY

An object of the present disclosure is to provide a thermoforming packaging machine and a method for operating a thermoforming packaging machine, in order to be able to produce an upright standing packaging with an undercut in a first side wall in an improved way, wherein ideally the second side wall, opposite the first side wall, should be independent from the inclination of the undercut of the first wall.

A thermoforming packaging machine according to the disclosure for producing upright standing packagings with a molded undercut comprises a forming station and a sealing station. The forming station comprises a molding or forming wall section movable within a lower forming tool and/or the sealing station comprises a lower sealing tool with a movable sealing seam support section for the undercut. This allows the production of an undercut on at least one side wall of the upright standing packaging, e.g. by means of a vertically arranged lifting unit or a vertical lifting movement at the forming or sealing station. Hence, the side walls of the packaging without the undercut may be formed as vertical side walls or in general independent from the inclination of the wall provided with the undercut, in order to maximize the packaging volume. In the context of the present disclosure, an undercut means that the formed packaging comprises a section below the plane of a packaging rim which projects below this packaging rim. In a projection onto the plane of the packaging rim, there is, therefore, an overlapping area between the packaging rim and the undercut.

Preferably, in the lower forming tool there is a movable forming wall section for each forming cavity, and/or in the lower sealing tool there is a movable sealing seam support section for at least one packaging to be sealed. Thereby, a collision of the undercut of the packaging with the lower forming tool or the lower sealing tool during opening of the forming or sealing station can be prevented.

In an advantageous embodiment, the forming wall section and/or the sealing seam support section comprises at least one upper portion which is upwardly pivotable and a lower portion which is movable in a downward and/or lateral manner, in order to allow an extraction of the undercut of the packaging from the lower forming tool and/or the lower sealing tool in a direction orthogonal to the packaging material plane after the forming or sealing process.

Preferably, the lower portion is pivotable around an axis which is parallel to the packaging sheet plane. This leads to a rather simple construction.

In a further embodiment, the upper portion is moveable or pivotable relative to the packaging material plane together with the movement of the lower forming tool or the lower sealing tool. Since the lower packaging foil still prevents a movement of the upper portion into the direction of the plane of the lower foil while the forming or sealing station is closed, a coupling of the movement of the upper portion with the movement of the lower forming tool or the lower sealing tool allows an opening of the forming or sealing station without collisions.

Preferably, the upper portion and the lower portion are movable independently from each other, in order to be able to perform these movements in a temporally parallel manner and in order to avoid an undue prolongation of the process times of the forming and sealing stations.

All lower portions are preferably movable by a common drive and/or all upper portions are movable by a common drive. This leads to a cost efficient construction, for example with a pneumatic cylinder or electric drive as the drive.

The movable sealing seam support section is preferably provided for one or several packagings, for example for a line or a track of packagings in a sealing station. This reduces the number of parts and facilitates the drive mechanism.

Alternatively to a pivotability, the forming wall section and/or the sealing seam support section can be movable parallel to the packaging foil plane, in order to achieve a simple construction and a movement which is independent from the packaging sheet plane.

Preferably, the movable forming wall sections comprise a common drive and/or the movable sealing seam support sections comprise a common drive.

Preferably, a return mechanism with at least one spring is provided for the movable forming wall section and/or for the sealing seam support section, in order to bias the forming wall section or the sealing seam support section into an open position. This allows the use e.g. of a cheap, unidirectionally acting pneumatic cylinder as a common drive.

In an advantageous embodiment, a control is provided for controlling or operating the movable forming wall section and/or the movable sealing seam support section.

In a method according to the present disclosure for operating a thermoforming packaging machine, in order to produce upright standing packages with a molded undercut, the thermoforming packaging machine comprises a forming station and a sealing station, which, in turn, comprise a lower forming tool or a lower sealing tool, respectively. According to the disclosure, a forming wall section of the lower forming tool is movable in the area of the undercut and/or a section of a sealing seam support of the lower sealing tool, on which a rim of the standing packaging rests during the sealing process, is movable relative to the remaining sealing seam support. This allows detaching the movable forming wall section or the movable sealing seam support section from the packaging after the forming or sealing process, in order to allow an extraction of the formed packaging tray or the complete packaging from the forming tool or from the sealing tool.

Optionally, the movable forming wall section or the sealing seam support section could be pivotable and/or movable in a translatory manner.

The moving of the movable forming wall section and/or the sealing seam support section can temporarily, at least partially, overlap with the movement of the lower forming tool or the lower sealing tool in a vertical direction or in general relative to an initial material plane, in order to avoid a collision of the lower toolings with the undercut.

In the following, an advantageous embodiment of the disclosure will be explained in more detail with reference to the below drawings.

BRIEF DESCRIPTION OF THE DRAWINGS

FIG. 3a shows a side view of the undercut of the packaging;

FIG. 3b shows a side view of the packaging in an upright standing position;

FIG. 5a shows a sectional view of the lower forming tool in a closed position;

FIG. 5b shows a sectional view of the lower forming tool in an open position;

FIG. 7a shows a sectional view of the lower sealing tool in a closed position;

FIG. 7b shows a sectional view of the lower sealing tool in an open position.

DETAILED DESCRIPTION

Figure 1:
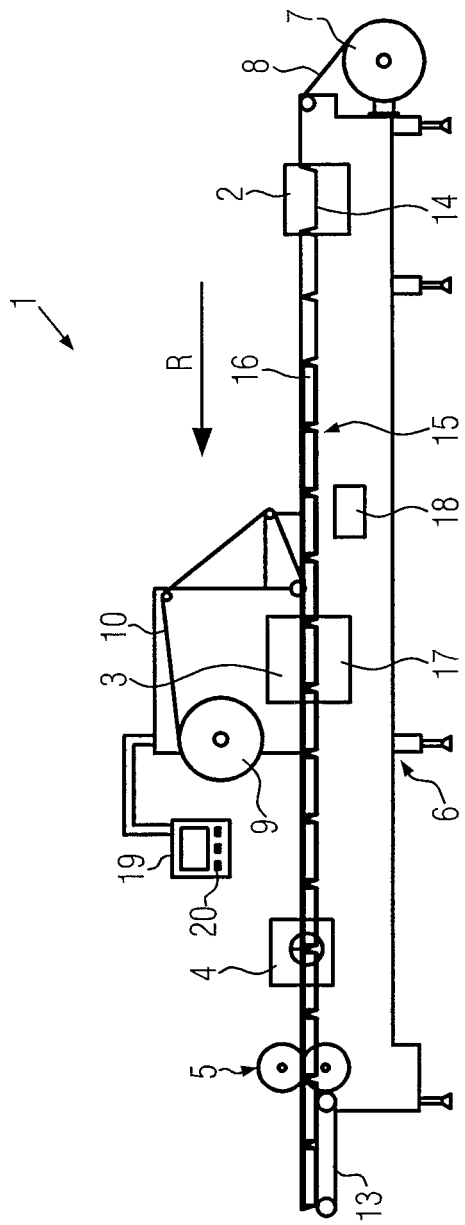
FIG. 1 is a schematic side view of a thermoforming packaging machine according to the disclosure.

Identical components are designated by identical reference numerals in all the figures.

FIG. 1 shows in a schematic view a packaging machine 1 according to the present disclosure in the form of a deep drawing packaging machine. This deep drawing packaging machine 1 comprises a forming station 2, a sealing station 3, a transverse cutting device 4 and a longitudinal cutting device 5, which are arranged in this order in the working direction R at a machine frame 6. On the input side, a supply roll 7 is provided on the machine frame 6, from which a first web material 8 or foil is unwound. In the area of the sealing station 3, a material storage unit 9 is provided, from which a second web material 10 or foil used as a cover sheet is unwound. On the output side, a discharge device 13 in the form of a conveyor belt is provided at the packaging machine, with which finished, singulated packages are transported away. Furthermore, the packaging machine 1 comprises a feed device which is not shown, said feed device gripping the first web material 8 and transporting it cyclically in a main work cycle in the working direction R. The feed device can be realized, for example, by laterally arranged transport chains.

In the embodiment shown, the forming station 2 is realized as a deep drawing station in which containers 14 are formed in the first web material 8 by deep drawing. The forming station 2 can be configured in such a way that in the direction perpendicular to the working direction R several containers are formed side by side. In the working direction R behind the forming station 2, a filling area 15 is provided, in which the containers 14 formed in the first web material 8 are filled with the product 16.

The sealing station 3 is provided with a closable chamber 17 in which the atmosphere in the container 14 can, prior to sealing, be substituted by a substitute gas or by a substitute gas mixture, e.g. by means of gas flushing.

The transverse cutting device 4 is configured as a punch separating the first web material 8 and the second web material 10 in a direction transversely to the working direction R between neighboring containers 14. In so doing, the transverse cutting device 4 works such that the first web material 8 is not cut across the whole width of the web, but remains uncut in at least a boundary area. This allows controlled further transport by the feed device.

In the embodiment shown, the longitudinal cutting device 5 is configured as a blade arrangement by means of which the first web material 8 and the second web material 10 are cut between neighboring containers 14 and at the lateral edge of the first web material 8, so that, downstream of the longitudinal cutting device 5, singulated packages are obtained.

The packaging machine 1 is additionally provided with a control unit 18. It is used for controlling and monitoring the processes taking place in the packaging machine 1. A display device 19 with operating controls 20 serves to visualize the sequences of process steps in the packaging machine 1 for an operator and to influence them by the operator.

The general mode of operation of the packaging machine 1 will be described briefly in the following.

The first web material 8 or foil is unwound from the supply roll 7 and conveyed into the forming station 2 by the feed device. In the forming station 2, containers 14 are formed in the first web material 8 by deep drawing. In a main work cycle, the containers 14 are advanced, together with the portion of the first web material 8 surrounding them, to the filling area 15 where they are filled with the product 16.

Subsequently, the filled containers 14, together with the portion of the first web material 8 surrounding them, are advanced by the feed device into the sealing station 3 in said main work cycle. After having been sealed onto the first web material 8, the second web material 10 is advanced as a cover sheet with the feed motion of the first web material 8. In the course of this process, the second web material 10 is unwound from the material storage unit 9. By sealing the cover sheet 10 onto the containers 14, closed packages 21 are obtained, which are then separated in the subsequent cutting stations 4, 5 and transported out of the deep drawing or thermal forming packaging machine 1 by means of the discharge device 13.

Figure 2:
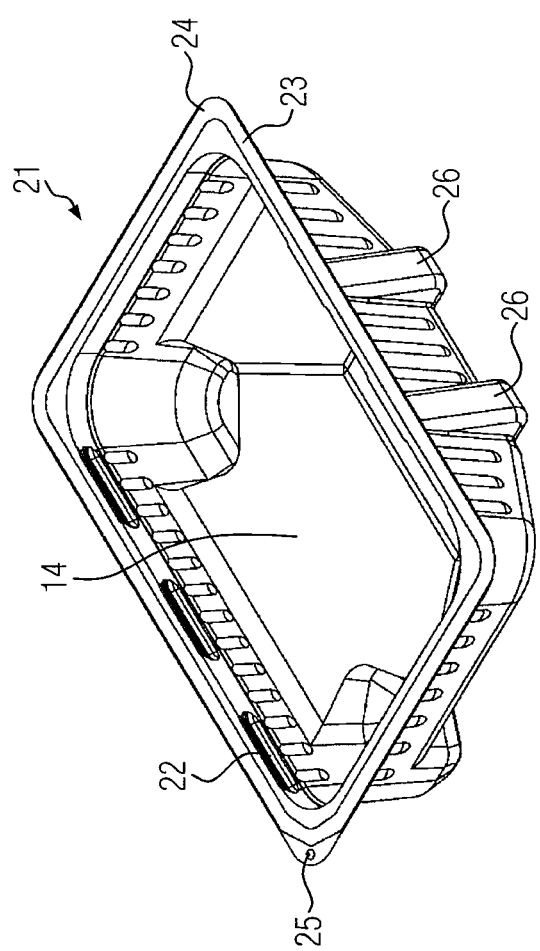
FIG. 2 shows a packaging.

FIG. 2 shows a complete standing packaging 21 according to the disclosure, which comprises a tray 14 for accommodating a product 16, and a re-closing nub 22. Along a horizontal, circumferential packaging rim 23 runs a similarly circumferential sealing seam 24, and in one corner an opening support 25 is shown in the shape of an upwardly projecting nub. Two undercuts 26 are formed into a lateral wall 27 of the standing packaging 21. These undercuts 26 are located directly below the packaging rim 23, or they can even project further laterally than the packaging rim 23.

In a side view of the packaging 21, FIG. 3a shows the undercuts, which have a horizontal depth T with respect to the lateral wall 27, and which also have an inclined orientation relative to a packaging foil plane E. The packing foil plane E is the plane of the packaging rim 23, from which the foil 8 was deep drawn.

FIG. 3b shows the standing packaging 21 in its intended sale position. The ability of the packaging to stand upright is achieved by a lower corner 28 of each of the two undercuts 26, together with the packaging rim 23, which is located on the same side as the undercuts 26. In this position, the standing packaging 26 stands on a plane F.

Figure 4:
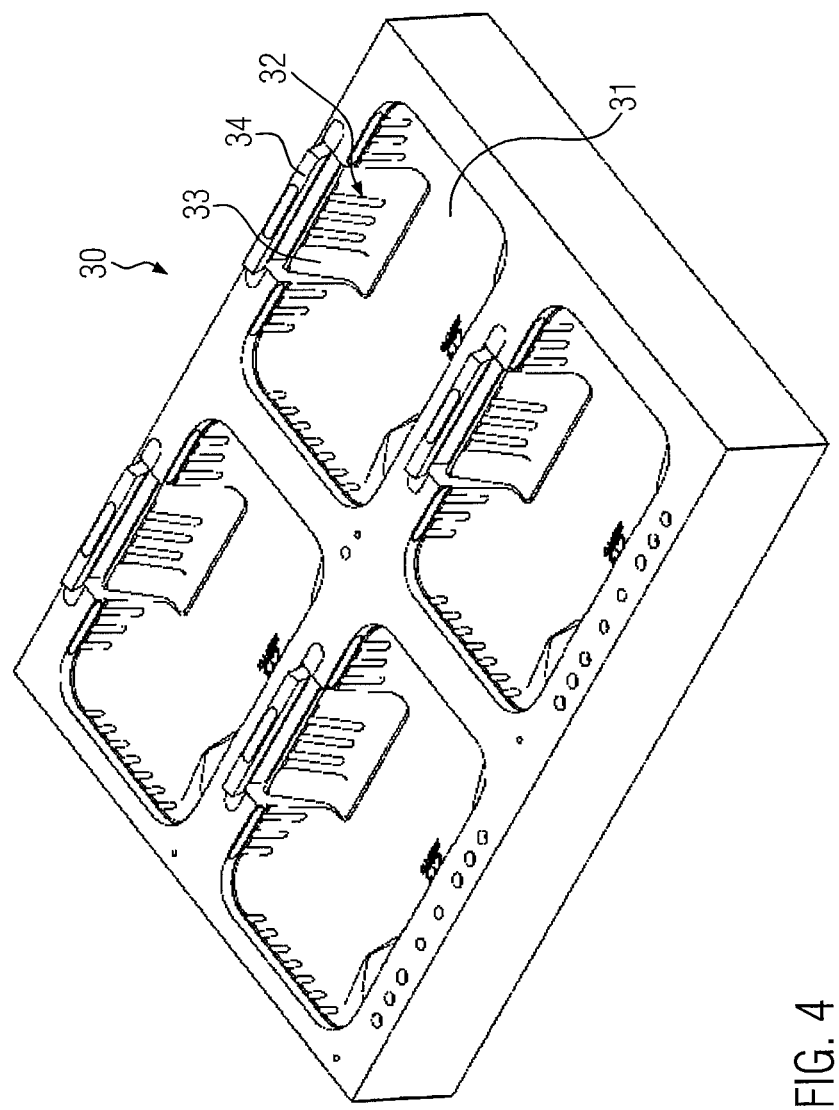
FIG. 4 shows a lower forming tool with an opened forming wall section.

FIG. 4 shows a lower forming tool 30 used in the forming station 2 with four forming cavities 31 for deep drawing a previously heated foil 8 by means of under pressure from below and/or over pressure from above. Optionally, a preferably heatable male forming die can be provided in addition to deep drawing the foil 8 by means of under pressure and/or over pressure, in order to deep draw the foil 8 into the forming cavities 31. This male forming die could deep-draw or thermoform the foil 8, in particular in areas in which e.g. due to small radii a deep drawing with under pressure or over pressure alone could be difficult. On one side of each of the forming cavities 31, a movable forming wall section 32 is provided, in order to allow a production of the undercut 26. The forming wall section 32 comprises a lower portion in the form of a pivotable forming bracket 33, and an upper portion in the form of an upper lever 34, and is therefore movable relative to the remaining lower forming tool 30.

As shown in FIG. 5a, the forming bracket 33 of the lower forming tool 30 is pivotable by means of a drive M2 around an axis 35 which is parallel to the packaging foil plane E. In an analogous manner, the lever 34 is pivotable by means of a drive M1 around a parallel axis 36. In FIG. 5a, the forming bracket 33 and the lever 34 are in a closed position, which is provided in order to deep-draw the foil 8 into the forming cavity 31. During this process, the undercut 26 is formed laterally projecting to the right over the side wall 27.

FIG. 5b shows the lower forming tool 30 with the forming bracket 33 pivoted in a clockwise direction. This allows the lower forming tool 30 to be vertically lowered, in order to release the thermoformed foil 8 for a further transport of the foil 8, without the molded packaging 21 colliding in the area of its undercuts 26 with the forming bracket 33 or the lever 34. The upper lever 34 passively pivots in a clockwise direction, while the lower forming tool 30 is downwardly disconnected from the foil 8, in order to similarly avoid a collision with the undercuts 26.

Figure 6:
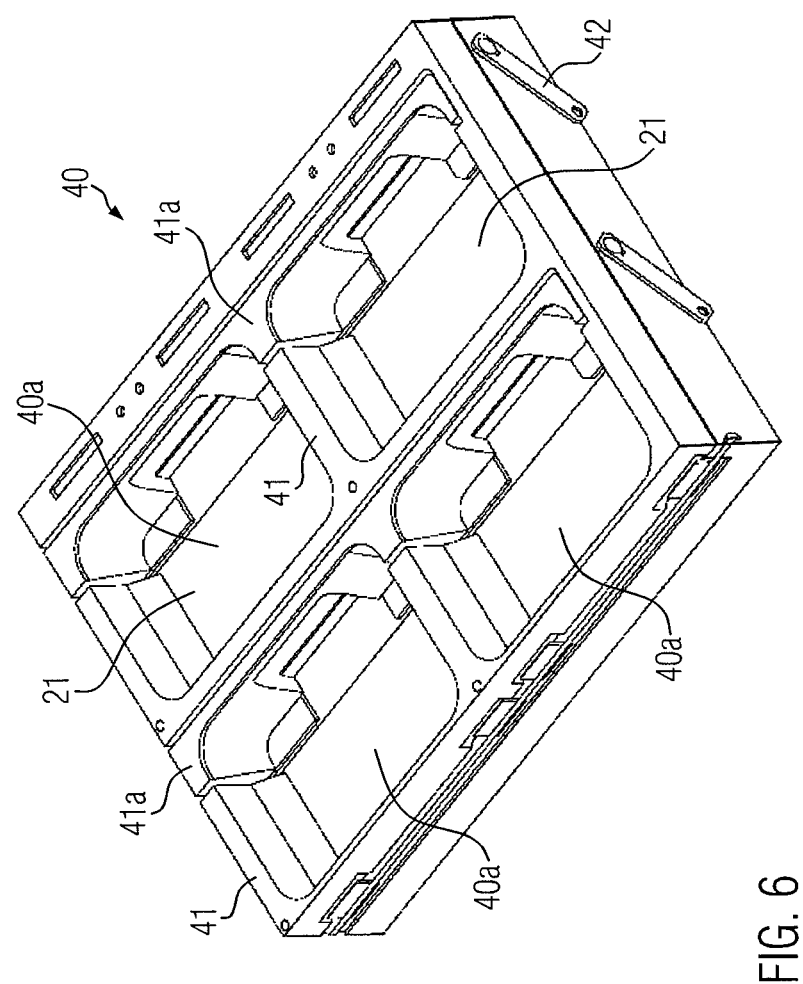
FIG. 6 shows a lower sealing tool with an opened sealing seam support section.

FIG. 6 shows a lower sealing tool 40 used in the sealing station 3 with sealing seam supports 41, which are provided for the rims 23 of the standing packagings 21. Each sealing seam support 41 is a horizontal area of the lower sealing tool 40 circumscribing a cavity or depression 40a for accommodating a packaging 21. During the sealing process, the horizontal packaging rim 23 of the standard packaging 21 rests on this horizontal, planar sealing seam support 41. During this process, the sealing seam support 41, together with the packaging rim 23, absorbs the forces exerted for sealing by the sealing tool.

A part of the sealing seam support 41, namely the sealing seam support section 41a, is movable relative to the remaining sealing seam support 41. In the lower sealing tool 40 according to FIG. 6, two of such movable sealing seam support sections 41a are provided, each of which is associated with two cavities 40a. A movement of the sealing seam support sections 41a is achieved via eccentric levers 42, which are commonly coupled and can be driven by means of a pneumatic cylinder as drive M3.

FIG. 7a shows the lower sealing tool 40 in a closed position, after the lower sealing tool 40 has been moved upwards in order to close the sealing station 3. By means of the eccentric lever 42 and an eccentric 43, the sealing seam support sections 41a are moved into the position in which they support the packaging rim 23, and the sealing is performed by applying pressure and temperature. This allows generating a sealing seam 24 on the packaging rim 23, which extends above the undercut 26.

As soon as the sealing process is terminated and no sealing pressure is present anymore, the sealing seam support section 41a is moved by a rotation of the eccentric lever 42 or the eccentric 43 to such an extent in an outward direction (in FIG. 7b: to the right) that the undercut 26 does not collide with the sealing seam support section 41a or the lower sealing tool 40 during the downward movement of the lower sealing tool 40.

Figure 8:
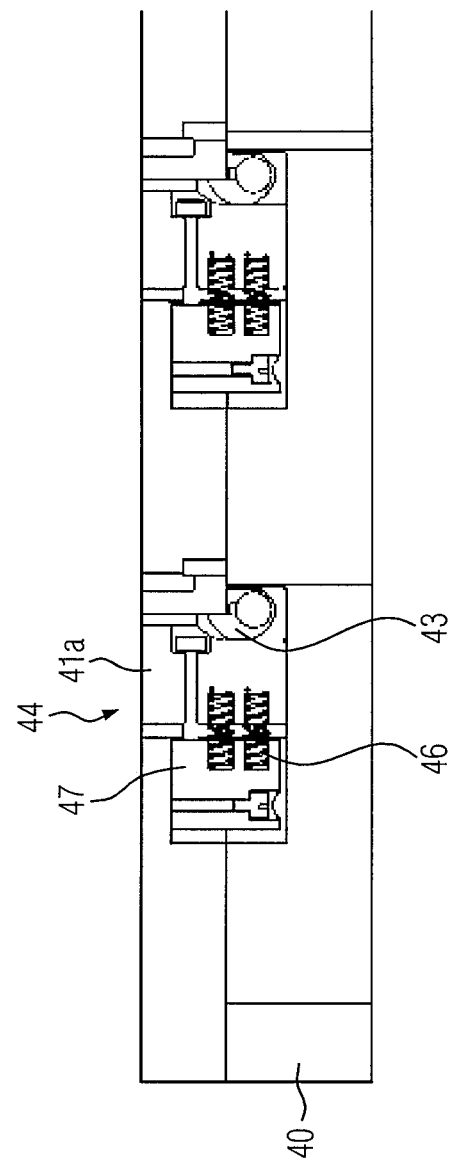
FIG. 8 shows a further sectional view of the lower sealing tool with a return mechanism.

In a further sectional view of the lower sealing tool 40, FIG. 8 shows a return device 44 for the sealing seam support section 41a. The sealing seam support section 41a moveable horizontally by the eccentric 43 is biased by springs 46 relative to an element 47, which is mounted on the lower sealing tool 40, towards the eccentric 43. Hence, this guarantees a return movement of the sealing seam support section 41a towards the eccentric 43, generated by the springs 46.

The shown number of four packagings 21 treated in the lower forming tool 30 or lower sealing tool 40 is not restrictive. Different arrangements or a different number of packagings 21 generated or closed in the tools 30, 40 are possible. The thermoforming packaging machine and the method for producing standing packagings according to the disclosure can also be reconfigured in a different way. It is conceivable, for example, that also the moveable forming wall section 32 of the lower forming tool 30 is movable in a translatory manner; be it in a unitary form, or in a two-part form with lower and upper portions 33, 34. Similarly, the movable sealing seam support section 41a could be pivotally supported instead of having a support for a translatory movement. And, just like the forming wall section 32, the sealing seam support section 41a could be configured in a two-part manner with upper and lower portions, instead of the shown unitary manner. Of course, it is conceivable that, departing from the shown embodiment, a single, movable sealing seam support section 41a could be provided individually for each cavity 40a in the lower sealing tool 40. In addition, it is conceivable that per forming cavity 31 in the lower forming tool 30 and/or per cavity 40a in the lower sealing tool 40, not only one, but several movable sections 32, 41a are provided, should this turn out to be beneficial due to the geometry of the undercuts 26.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A thermoforming packaging machine for producing standing packagings with an undercut molded into each of the packagings, the thermoforming packaging machine comprising:
   a forming station with a lower forming tool; and
   a sealing station with a lower sealing tool, the lower sealing tool comprising a sealing seam support for supporting a rim of a packaging during a sealing process;
   wherein the lower forming tool comprises a pivotable forming wall section and/or the sealing seam support comprises a pivotable sealing seam support section;
   wherein the forming wall section and/or the sealing seam support section comprises at least one upper portion pivotable upwards and at least one lower portion movable in a downward and/or lateral manner, in order to allow an extraction of the undercut of the packaging from the lower forming tool or the lower sealing tool orthogonally to a plane of a packaging material after the respective forming or sealing process.

2. The thermoforming packaging machine according to claim 1 wherein the lower forming tool comprises one or multiple forming cavities, and an individual forming wall section is provided for each of the forming cavities.

3. The thermoforming packaging machine according to claim 1 wherein the sealing seam support of the lower sealing tool comprises the pivotable sealing seam support section, and the sealing seam support section is part of the sealing seam support for one or a plurality of packagings.

4. The thermoforming packaging machine according to claim 1 wherein each lower portion is pivotable about an axis that is parallel to the packaging material plane.

5. The thermoforming packaging machine according to claim 1 wherein each upper portion is pivotable together with the lower forming tool or the lower sealing tool with respect to the packaging material plane.

6. The thermoforming machine according to claim 1 wherein each lower portion is movable independently of each upper portion.

7. The thermoforming machine according to claim 1 wherein all of the lower portions of the lower forming tool or the lower sealing tool are movable by a common drive.

8. The thermoforming packaging machine according to claim 1 further comprising a common drive for moving all upper portions of the lower forming tool or the lower sealing tool.

9. The thermoforming packaging machine according to claim 1 wherein the lower forming tool comprises a plurality of the forming wall sections and/or the sealing seam support comprises a plurality of the sealing seam support sections, and wherein the thermoforming packaging machine further comprises a common drive for pivoting the forming wall sections and/or the sealing seam support sections.

10. The thermoforming packaging machine according to claim 1 further comprising a return mechanism associated with the forming wall section and/or the sealing seam support section, in order to bias the forming wall section and/or the sealing seam support section into an open position, wherein the return mechanism comprises at least one spring.

11. The thermoforming packaging machine according to claim 1 further comprising a control for controlling the movable forming wall section and/or the movable sealing seam support section.

12. A thermoforming packaging machine for producing standing packages with an undercut molded into each of the packages, the thermoforming packaging machine comprising:
a forming station with a lower forming tool for forming a packaging tray such that the packaging tray has a rim and an undercut; and
a sealing station with a lower sealing tool, the lower sealing tool comprising a sealing seam support for supporting the rim of the packaging tray during a sealing process in which a cover is sealed onto the packaging tray;
wherein, for facilitating extraction of the undercut of the packaging tray from the lower forming tool and/or the lower sealing tool, the lower forming tool comprises a movable forming wall section that is movable with respect to another section of the lower forming tool and/or the sealing seam support comprises a movable sealing seam support section that is movable with respect to another section of the sealing seam support; and
wherein the movable forming wall section comprises an upper portion and a lower portion that are movable with respect to each other and pivotable with respect to the another section of the lower forming tool and/or the movable sealing seam support section comprises an upper portion and a lower portion that are movable with respect to each other and pivotable with respect to the another section of the lower sealing tool.

13. A thermoforming packaging machine for producing standing packagings with an undercut molded into each of the packagings, the thermoforming packaging machine comprising:
a forming station with a lower forming tool; and
a sealing station with a lower sealing tool, the lower sealing tool comprising a sealing seam support for supporting a rim of a packaging during a sealing process;
wherein the lower forming tool comprises a movable forming wall section and/or the sealing seam support comprises a movable sealing seam support section;
wherein the forming wall section and/or the sealing seam support section comprises at least one upper portion pivotable upwards and at least one lower portion movable in a downward and/or lateral manner, in order to allow an extraction of the undercut of the packaging from the lower forming tool and/or the lower sealing tool.

* * * * *